United States Patent
Vawter

(10) Patent No.: US 7,823,772 B2
(45) Date of Patent: Nov. 2, 2010

(54) TRANSACTION INFORMATION MINING

(75) Inventor: Jamison Vawter, Freehold, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1120 days.

(21) Appl. No.: 11/463,326

(22) Filed: Aug. 9, 2006

(65) Prior Publication Data

US 2008/0035724 A1 Feb. 14, 2008

(51) Int. Cl.
- *G06K 5/00* (2006.01)
- *G06F 7/08* (2006.01)
- *G06Q 30/00* (2006.01)
- *G06Q 20/00* (2006.01)

(52) U.S. Cl. ............... 235/380; 235/381; 235/382; 705/14; 705/14.1; 705/17

(58) Field of Classification Search ......... 235/379–382, 235/487, 492; 705/14, 14.1, 14.38, 17
See application file for complete search history.

(56) References Cited

U.S. PATENT DOCUMENTS

| | | | | |
|---|---|---|---|---|
| 7,127,236 B2 * | 10/2006 | Khan et al. | ............... | 455/414.1 |
| 7,330,714 B2 * | 2/2008 | Rosenberg | ............... | 455/412.1 |
| 2002/0066042 A1 * | 5/2002 | Matsumoto et al. | ......... | 713/202 |
| 2002/0152178 A1 * | 10/2002 | Lee | ............... | 705/67 |
| 2003/0130902 A1 * | 7/2003 | Athwal | ............... | 705/26 |
| 2003/0212595 A1 * | 11/2003 | Antonucci | ............... | 705/14 |
| 2008/0277465 A1 * | 11/2008 | Pletz et al. | ............... | 235/379 |

* cited by examiner

*Primary Examiner*—Thien M. Le
*Assistant Examiner*—April A Taylor

(57) ABSTRACT

A managed service may include first logic to provide authentication information to a device on behalf of a mobile terminal to identify the mobile terminal for a near field transaction with the device, and receive transaction information from the device, where the transaction information is produced by the device on behalf of the mobile terminal. The first logic may further receive user information via the mobile terminal, the user information identifying characteristics of a user of the mobile terminal. The managed service may include second logic to produce a result that comprises information mined from the transaction information or user information, where the result identifies characteristics of the transaction or the user.

23 Claims, 14 Drawing Sheets

STORE NAME: WALLY'S MEGA MART /793

STORE ID: 001-FAIRFAX, VA /740

LOCATION: 007 BOND PLAZA /720

TRANSACTION #: 001 /740

DATE/TIME: MAY 15, 2006 0930 /730

| ITEM /750 | QUANTITY /760 | PRICE /770 | DESCRIPTION /780 |
|---|---|---|---|
| MILK | 1 | $2.99 | 2%, 1 GALLON |
| COOLER | 1 | $15.00 | 24 QUART, IGLOO |
| YOGURT | 5 | $3.75 | DANNON, 4OZ |
| MEAT | 2 LBS | $11.98 | T-BONE |
| TOTAL PRICE: | | $33.72 /791 | |

| ENTERPRISE ID | | | LOCATION | | | |
|---|---|---|---|---|---|---|
| DATE | | | OTHER INFORMATION | | | |
| CUSTOMER ID | TRANSACTION ID | AUTHORIZATION ID | VALID | LINK | AUTHORIZATION DATE/TIME | |
| B.SMITH | 001 | SMITH-001 | YES | L-1 | 5/14/06 0700 | |
| J.JONES | 1234 | JONES-003 | YES | L-2 | 5/14/06 0710 | |
| T.REX | KMART-01 | REX-333 | YES | L-3 | 5/20/06 1400 | |
| ■ ■ ■ | ■ ■ ■ | ■ ■ ■ | ■ ■ ■ | ■ ■ ■ | ■ ■ ■ | |
| D.KING | KMART-02 | 555-123 | NO | L-4 | N/A | |

FIG. 8

| CUSTOMER ID: B.SMITH | | | | | |
|---|---|---|---|---|---|
| DATE: JUNE 1, 2006 | | | | | |
| RETAILER ID | TRANSACTION ID | TRANSACTION DATE/TIME | ITEMS | TRACKING DATA | OTHER INFORMATION |
| KMART | 001 | 5/15/06, 0930 | K-1 | YES | OUT OF AREA |
| KROGERS | 002 | 5/18/06, 1045 | KR-2 | NO | CASH TRANSACTION |
| SEARS | 003 | 5/18/06, 1100 | S-1 | YES | PHONE PURCHASE |
| ■ ■ ■ | ■ ■ ■ | ■ ■ ■ | ■ ■ ■ | ■ ■ ■ | ■ ■ ■ |
| L.L.BEAN | 004 | 5/30/06, 0600 | LL-1 | YES | WEB PURCHASE |

FIG. 9

TRANSACTION INFORMATION MINING

BACKGROUND OF THE INVENTION

An entity, such as a corporation, may wish to obtain information about individuals, such as customers. For example, a corporation may wish to obtain information about purchasing habits of individuals so that the corporation can stock merchandise that is desirable to these individuals.

Corporations may hire polling agencies to conduct surveys of consumers to obtain information about their purchasing habits. Polling agencies may telephone consumers or may send written questionnaires to consumers to obtain information about consumers' recent purchases. Preparing survey questions and questionnaires, conducting the surveys, and processing survey results may be time consuming. In addition, obtaining information from consumers via surveys may be error prone because a consumer may exaggerate his/her answers, may not completely recall his/her purchases, etc. As a result, corporations may experience difficulty in getting accurate purchasing information from consumers.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 7B illustrates an exemplary receipt that can include the information of FIG. 7A;

FIG. 8 illustrates an exemplary data structure to store customer and transaction information on the server of FIG. 1;

FIG. 9 illustrates an exemplary data structure to store transaction information that can be used for data mining in the server of FIG. 1;

DETAILED DESCRIPTION OF PREFERRED EMBODIMENTS

Figure 1:
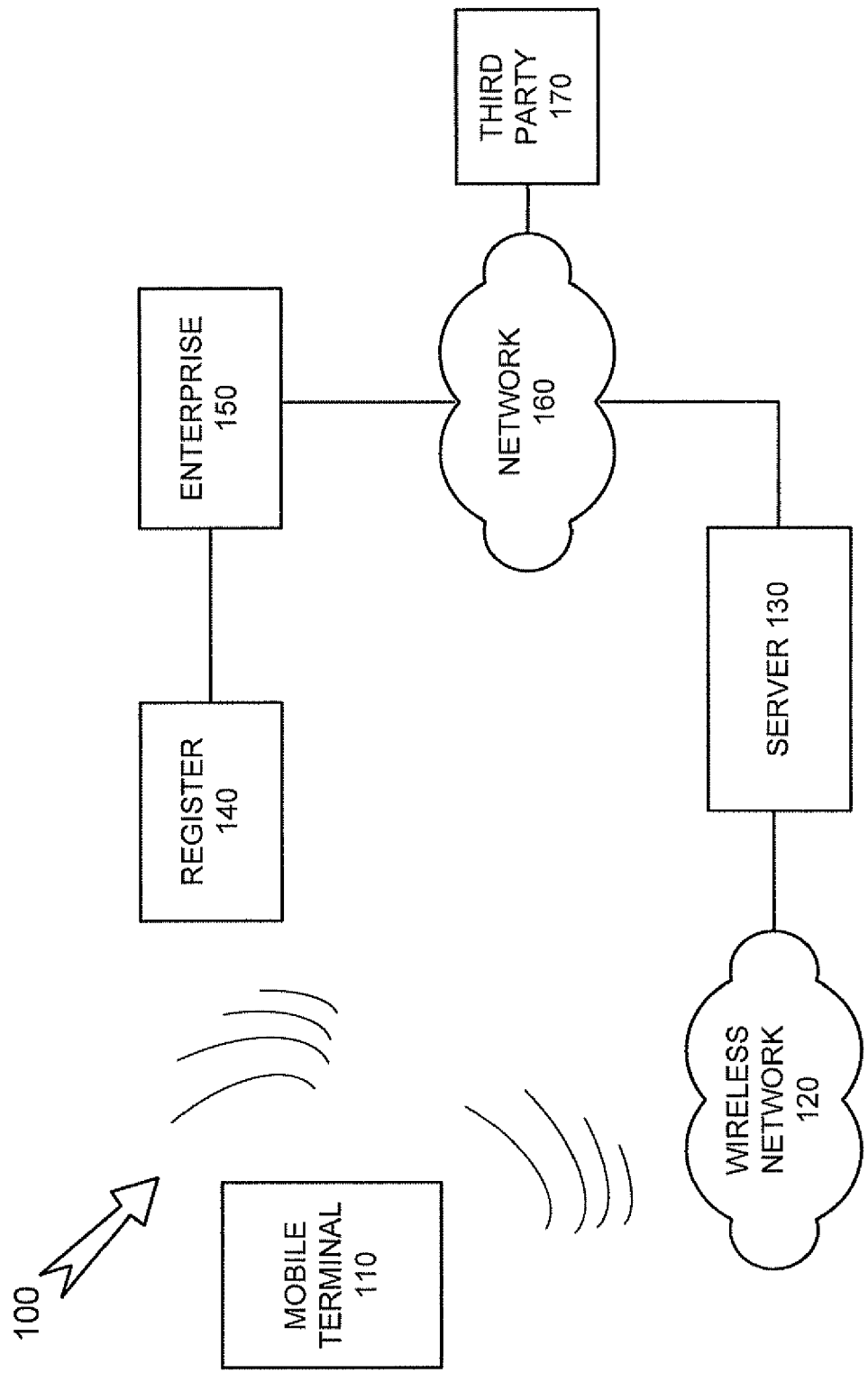
FIG. 1 illustrates an exemplary system that can be configured to operate in accordance with principles of the invention.

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Techniques described herein may provide entities with accurate information about transactions. For example, a consumer may use a cell phone to establish a secure communication session with a cash register at a store. The cell phone may receive information contained in the cash register receipt via the wireless link, and the cash register may send the transaction information to a server. In another implementation, the cell phone may send frequent shopper information (e.g., a frequent shopper card number) to the register and/or may send other information to the register (e.g., a customer zip code, phone number, etc.), where the frequent shopper number and/or other information may be used for data mining activities related to consumer data by a store operating the register. In still another implementation, the cell phone may receive a query (such as a query for a consumer's phone number) and the cell phone may send a denial message to the register, where the denial message indicates that the consumer does not wish to provide his/her telephone number.

A consumer may enroll in a rewards program before interacting with a register, while interacting with a register, or after interacting with a register, whereby the consumer is compensated for agreeing to provide information about his/her transactions to a third party, such as a third party that assembles surveys of consumer purchasing habits.

Transaction information related to the transaction between the consumer and the register may be sent to the server on behalf of the consumer from the cell phone and/or from the register since both devices can maintain detailed information about the transaction. The server may send a reward (e.g., a store credit, coupon, cash, free downloads, etc.) to the consumer's cell phone when the consumer's transaction information is received at the server.

The server may mine information from the consumer's transaction and may combine the mined information with information obtained from other consumers and/or retailers. The server may provide the mined information to entities, such as corporations, marketing agencies, institutions, etc., for a fee or on a subscription basis, such as via a managed service.

As used herein, "consumer," "customer," or "user" may refer to an individual that can participate in a transaction. A consumer/customer/user may be identified with a device (e.g., a mobile terminal), a group (e.g., employees of a corporation, students at a school, etc.), a location (e.g., a neighborhood, city, etc.), etc. "Transaction" may refer to an exchange of information between two parties, such as a customer and a retailer. A transaction may include a purchase, an exchange, a credit, request for services, etc. In one implementation, a transaction may include an exchange of monetary information (e.g., electronic money, credit card information, automated teller machine (ATM) information, etc.). In another implementation, a transaction may include an exchange of mined consumer data, where the consumer data is related to one or more purchasing transactions.

Implementations and processes for mining transaction information as described herein may be incorporated into various devices and/or systems and/or may be used with a number of techniques, such as those described in patent application Ser. No. Ser. No. 11/465,271 entitled "Multi-Function Transaction Device," filed Aug. 17, 2006; Ser. No. 11/466,215 entitled "Party Identification In A Wireless Network," filed Aug. 22, 2006; Ser. No. 11/465,935 entitled "Secure Near Field Transaction," filed Aug. 21, 2006; and Ser. No. 11/466,544 entitled "Virtual Wallet," filed on Aug. 23, 2006, the content of the above applications are incorporated herein by reference in their entireties, respectively.

FIG. 1 illustrates an exemplary system 100 that can be configured to operate in accordance with principles of the invention. System 100 may include a mobile terminal 110 (hereinafter terminal 110), a wireless network 120, a server 130, a register 140, an enterprise 150, a network 160, and a third party 170.

Terminal 110 may include a device capable of exchanging information with a destination. For example, terminal 110 may include a handheld device, such as a web-enabled cellular telephone, an Internet protocol (IP) telephone, a personal digital assistant (PDA), a computer, such as a laptop computer, a plain old telephone system (POTS) device, etc. Other implementations of terminal 110 may include other devices, such as a server and/or another computation or communication device. Terminal 110 may communicate via packet based or non-packet based wireless communication paths.

In one implementation, terminal 110 may include hardware or software to establish a secure communication session with a destination, such as register 140 and/or wireless network 120. Terminal 110 may be adapted to perform near field wireless communication, e.g., communication over a distance of several inches to a few feet, and/or far field communication, e.g., communication over substantially any distance. Terminal 110 may be configured to store information about one or more transactions and/or may send and/or receive transaction information to/from another device, such as register 140 and/or server 130. For example, terminal 110 may store information about a purchase transaction, such as information about purchased items, item prices, a location where items were purchased, information about a method of payment, etc. Terminal 110 may further send the stored information to a destination.

Wireless network 120 may include a network that transfers information. Implementations of wireless network 120 may include cellular networks and/or other types of wireless networks, such as ad hoc wireless networks, free-space optical networks, etc. Wireless network 120 may send and/or receive information via packet-based or non-packet based exchanges. In one implementation, wireless network 120 may be operated by a service provider that provides wireless communication services to a customer, such as a user of terminal 110, as a managed service (e.g., for a monthly fee).

Server 130 may include a device that receives information from, or transmits information to, another device and/or network. For example, server 130 may include a workstation, desktop computer, laptop computer, PDA, web enabled cellular telephone, Wi-Fi device, or another type of network device. Server 130 may run applications, such as server applications, data mining applications, authentication and/or authorization applications, database applications, email applications, reporting applications, communication applications (e.g., wireless communication applications), e-commerce applications, etc.

In one implementation, server 130 may provide a service, such as a managed service, to other devices in system 100, such as terminal 110 and/or enterprise 150. For example, server 130 may provide communication services to terminal 110, data mining services to enterprise and/or third party 170, transaction storage services to enterprise 150 and/or terminal 110, etc.

Register 140 may include a device that performs a transaction on behalf of a customer or device. For example, register 140 may include a cash register operated by a retailer, a transaction server operated by a web-based retailer, a computer operated by a government agency (e.g., a department of motor vehicles), a computer operated by a hospital or doctor's office, etc. Register 140 may communicate with terminal 110 via a near field wireless link while performing a transaction on behalf of terminal 110. Register 140 may further communicate with enterprise 150 and/or server 130 regarding the transaction, such as by sending transaction details to enterprise 150 or server 130 via a network.

Enterprise 150 may include a device that hosts one or more registers 140. For example, enterprise 150 may include a server that is connected to registers 140 operating within a retail store. Enterprise 150 may receive transaction information from one or more registers 140 and may store, process, and/or send the information to a destination, such as server 130. Enterprise 150 may request information from server 130, such as information about a transaction, information about consumer purchasing habits, etc.

Network 160 may include any network capable of transferring information. Implementations of network 160 may include public switched telephone networks (PSTNs), local area networks (LANs), metropolitan area networks (MANs) and/or wide area networks (WANs), such as the Internet, that may operate using substantially any network protocol, such as Internet protocol (IP), asynchronous transfer mode (ATM), synchronous optical network (SONET), etc.

Network 160 may include network devices, such as routers, switches, firewalls, gateways, and/or servers (not shown). Network 160 may be a hardwired network using wired conductors and/or optical fibers and/or may be a wireless network using free-space optical and/or radio frequency (RF) transmission paths. Implementations of networks and/or devices operating on networks described herein are not limited to any particular data type, and/or protocol.

Third party 170 may include a device that sends or receives information via network 160. In one implementation, third party 170 may include a mined data server that provides mined consumer data to subscribers, such as enterprise 150. A mined data server may process mined data received from server 130 and may send the mined data to subscribers as a data structure, a report, an audio file, a video file, etc. In another implementation, third party 170 may be a device that participates in a transaction, such as a device that verifies a credit card number, maintains a financial account on behalf of a consumer, etc. Third party 170 may be operated by server 130 and/or may be operated by another entity. In one implementation, third party 170 may provide services to enterprise 150 as a managed service, e.g., a subscription based service.

Figure 2:
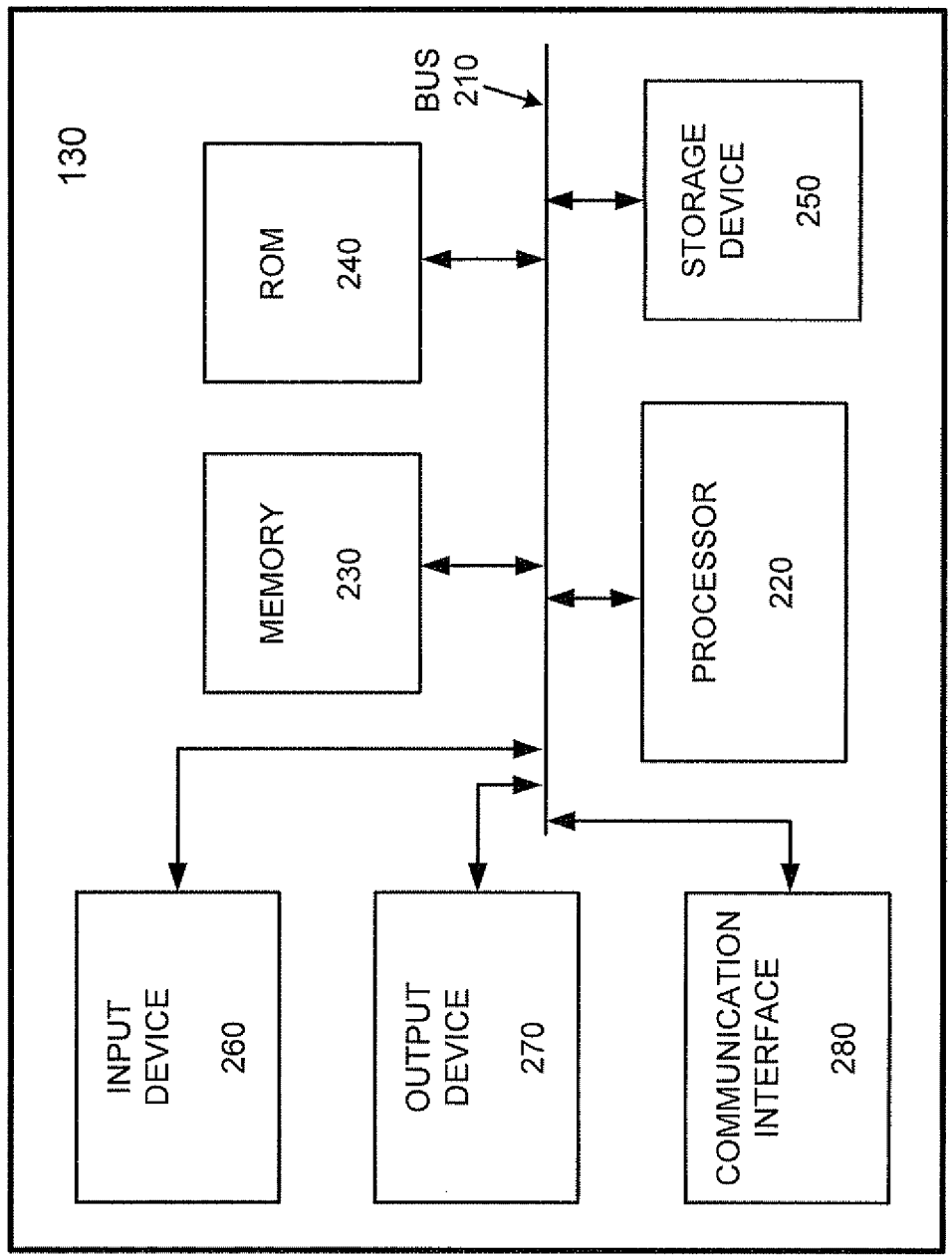
FIG. 2 illustrates an exemplary architecture for implementing the server of FIG. 1.

FIG. 2 illustrates an exemplary architecture for implementing server 130. It will be appreciated that terminal 110, register 140, enterprise 150, third party 170, and/or other devices (not shown) that can be used in system 100 may be similarly configured. As illustrated in FIG. 2, server 130 may include a bus 210, a processor 220, a memory 230, a read only memory (ROM) 240, a storage device 250, an input device 260, an output device 270, and a communication interface 280.

Bus 210 may include one or more interconnects that permit communication among the components of server 130. Processor 220 may include any type of processor, microprocessor, or processing logic that may interpret and execute instructions. Memory 230 may include a random access memory (RAM) or another type of dynamic storage device that may store information and instructions for execution by processor 220. Memory 230 may also be used to store temporary variables or other intermediate information during execution of instructions by processor 220.

ROM 240 may include a ROM device and/or another type of static storage device that may store static information and instructions for processor 220. Storage device 250 may include a magnetic disk and/or optical disk and its corresponding drive for storing information and/or instructions.

Input device 260 may include any mechanism or combination of mechanisms that permit server 130 to accept information from an operator, such as a system administrator, via devices, such as a keyboard, a mouse, a microphone, a pen-based pointing device, and/or a biometric input device, such as a voice recognition device and/or a finger print scanning device. Output device 270 may include any mechanism or combination of mechanisms that outputs information to the operator, including a display, a printer, a speaker, etc.

Communication interface 280 may include any transceiver-like mechanism that enables server 130 to communicate with other devices and/or systems, such as terminal 110, register 140, enterprise 150, and/or third party 170. For example, communication interface 280 may include a modem, an Ethernet interface, a wireless interface, and/or a port. Alternatively, communication interface 280 may include other mechanisms for communicating via a network, such as network 160.

Server 130 may perform certain functions in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features consistent with the principles of the invention. Thus, implementations consistent with the principles of the invention are not limited to any specific combination of hardware circuitry and software.

Figure 3:
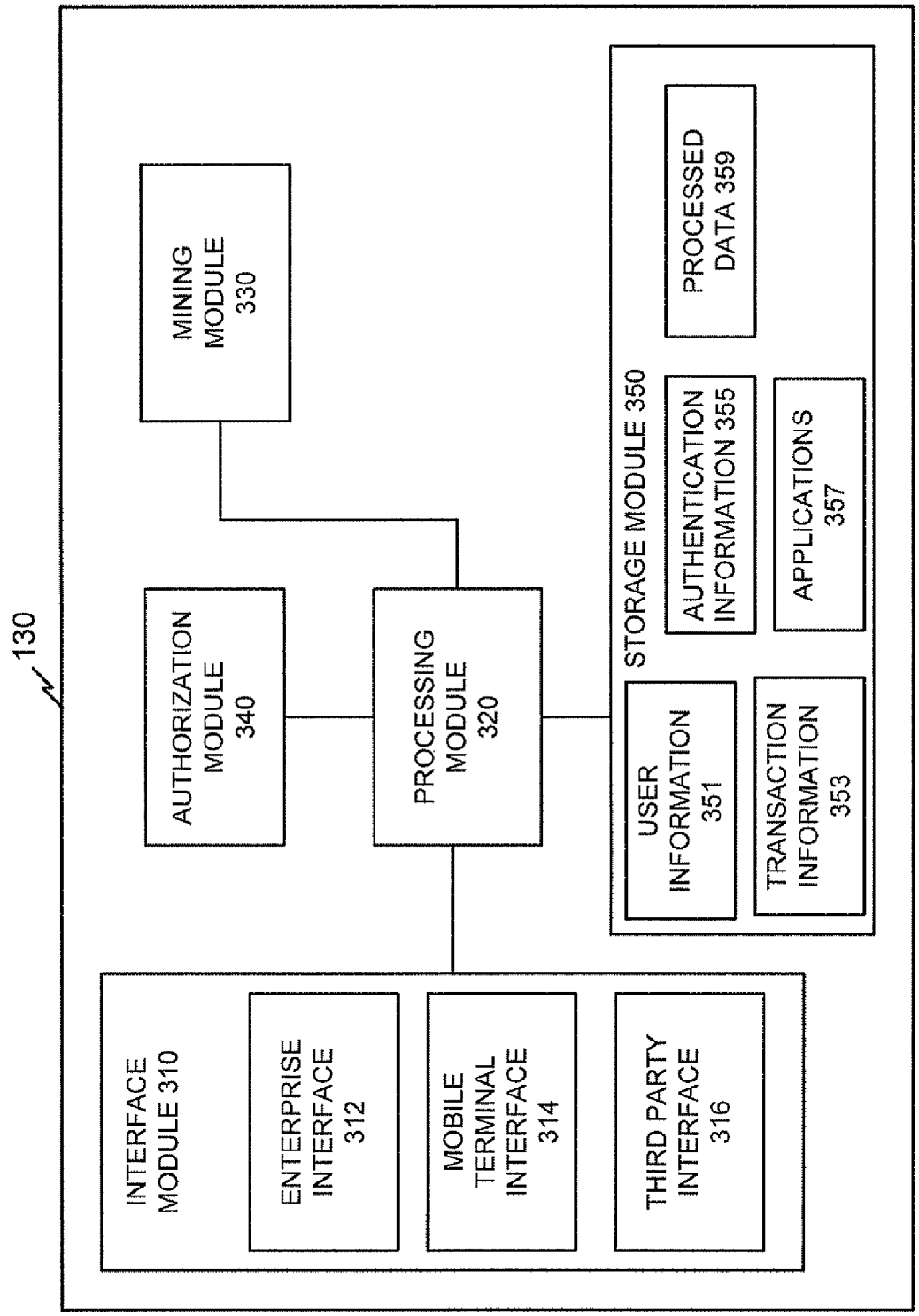
FIG. 3 illustrates an exemplary functional diagram of the server of FIG. 1.

FIG. 3 illustrates an exemplary functional diagram of server 130. Server 130 may implement hardware or software based logic to operate as a managed service provisioning device, an authorization device, a data mining device, a remote storage device, etc. Implementations of server 130 may operate on behalf of devices on wireless network 120 or network 160, such as terminal 110, enterprise 150, and/or third party 170.

An implementation of server 130 may include an interface module 310, a processing module 320, a mining module 330, an authorization module 340, and a storage module 350.

Interface module 310 may include hardware or software based logic to send and/or receive information. Interface module 310 may include an enterprise interface 312, a mobile terminal interface 314, and a third party interface 316.

Enterprise interface 312 may include hardware or software based logic to exchange information with enterprise 150. For example, enterprise interface 312 may include a network interface configured to exchange encrypted or un-encrypted information with enterprise 150. In an implementation, server 130 may receive transaction information or other types of information from enterprise 150 via enterprise interface 312.

Mobile terminal interface 314 may include hardware or software based logic to send information to and/or to receive information from terminal 110. Mobile terminal interface 314 may include a transceiver that sends and receives wireless data to/from terminal 110 via wireless network 120. Mobile terminal interface 314 may be adapted to send and receive encrypted information and/or un-encrypted information.

Third party interface 316 may include hardware or software based logic to exchange information with another device or software module operating in system 100, such as third party 170. For example, third party interface 316 may include logic that allows server 130 to send mined information to third party 170 via network 160. In one implementation, third party interface 316 my send information to other devices or software modules. Third party interface 316 may be adapted to exchange encrypted or un-encrypted information with the other device or software module.

Processing module 320 may include hardware or software based logic to process instructions related to providing services to terminal 110, enterprise 150, and/or third party 170, exchanging information with devices in system 100, processing data related to transactions (e.g., mined data) for devices in system 100, etc. Processing module 320 may be implemented in a standalone or distributed configuration, such as by being distributed across one or more devices.

Mining module 330 may include hardware or software based logic to obtain and process information related to terminal 110, a user of terminal 110, register 140, enterprise 150, and/or transactions related to other devices or users related to system 100. For example, mining module 330 may identify information in transactions (e.g., transaction items) stored in storage module 350 that may be useful for generating reports detailing customer spending habits with respect to determined criteria (e.g., items purchased, prices paid, locations where purchases were made, etc.). Mining module 330 may process transaction related information and may produce a mining result that can be incorporated into a report. The report may be made available to a subscriber, such as enterprise 150 as part of a managed service offered by server 130 or a device affiliated with server 130, such as third party device 170.

Authorization module 340 may include hardware or software based logic to identify a user of terminal 110 or another device in system 100, to identify a device in system 100, and/or to determine whether a user/device is authorized to access a destination, participate in a transaction, and/or receive information. Authorization module 340 may operate with authorization devices and/or mechanisms, such as password generators, pseudo-random number generators, passwords, tokens, biometric identifiers, and/or other identifiers to establish an identity of a user or device. Authorization module 340 may use authorization mechanisms to validate an identity of terminal 110 so that terminal 110 may access portions of a protected resource (e.g., a storage disk or a data directory), may communicate with a protected resource (e.g., register 140), and/or may receive protected information from another device. Implementations of authorization module 340 may operate with encrypted and/or unencrypted information when authorizing a user or device.

Storage module 350 may include hardware or software based logic to store information related to users, devices operated by users, transactions, payment information, account information, mining results, authentication information, etc. Storage module 350 may be implemented in server 130 and/or may be located remotely with respect to server 130 and connected thereto via a link. Storage module 350 may be implemented in memory 230, ROM 240 and/or storage device 250. In one implementation, storage module 350 may include user information 351, transaction information 353, authentication information 355, applications 357, and processed data 359.

User information 351 may include information about a user of terminal 110. For example, user information 351 may include a name, address, telephone number, mobile terminal identifier (e.g., a serial number), income information, shopping habit information, hobby information, family information (e.g., number of persons and ages of persons in a family or household), etc.

Transaction information 353 may include information related to a transaction. For example, transaction information 353 may include information about items purchased, quantities of items purchased, sizes, shapes, and/or styles of items purchased, date/time information related to a transaction, a transaction identifier, a merchant identifier, a location identifier, etc.

Authentication information 355 may include information related to the authentication, authorization, validation, and/or identification of a user and/or device (e.g., terminal 10, register 140, etc.) in system 100. Authentication information 355 may include a user name, password, personal identification number (PIN), token, secure identification (secure ID) value, certificate, watermark, merchant identifier, transaction identifier, code (e.g., a script), etc.

Applications 357 may include software applications residing on server 130. Applications 357 may include communication applications, database applications, location tracking applications, accounting applications, data information mining applications, etc.

Processed data 359 may include information processed using one or more applications. For example, processed data 359 may include information produced by running data mining code against transaction information 353 and/or user information 351. Processed data 359 may be used by devices or persons to make determinations with respect to customers (e.g., customer shopping patterns), transactions, devices in system 100, etc.

Figure 4:
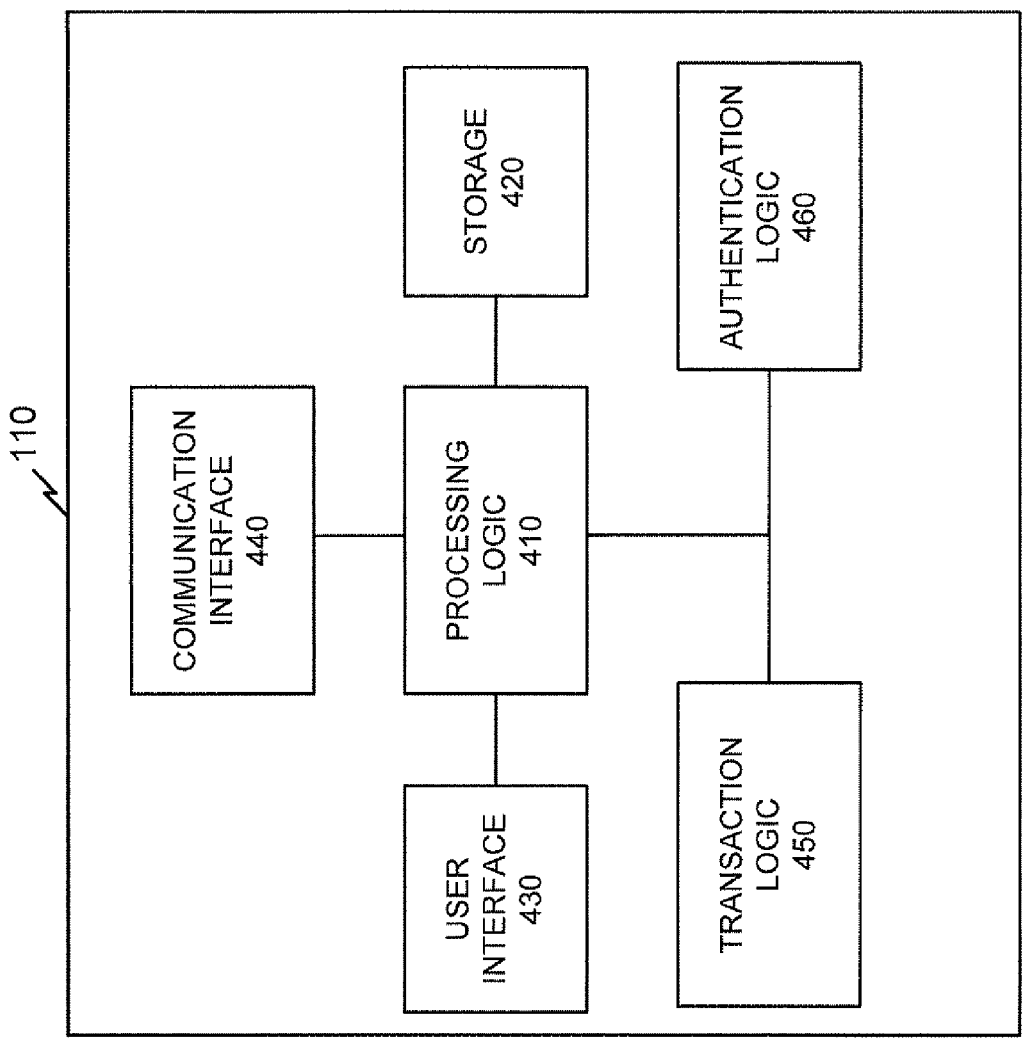
FIG. 4 illustrates an exemplary functional diagram of the mobile terminal of FIG. 1.

FIG. 4 illustrates an exemplary functional diagram of terminal 110. An implementation of terminal 110 may include processing logic 410, storage 420, user interface 430, communication interface 440, transaction logic 450, and authentication logic 460.

Processing logic 410 may include hardware and/or software to process instructions related to operating terminal 110. For example, processing logic 410 may process instructions to allow terminal 110 to receive a token, to establish a secure communication session with register 140, to participate in a transaction with register 140, and/or to establish communication sessions with other devices in system 100. Processing logic 410 may be implemented in a standalone or distributed configuration, such as by being distributed across one or more devices.

Storage 420 may include hardware or software based logic to store information related to transactions, payments, accounts, calendars, phone/address books, images, text, music, navigation applications, etc. Storage 420 may be implemented locally in terminal 110 and/or may be located remotely with respect to terminal 110 and connected thereto via a link, e.g., when server 130 provides remote storage capabilities to terminal 100.

User interface 430 may include hardware or software based logic that allows a user to interact with terminal 10. User interface 430 may include a keypad or other input device, a display, a speaker, a microphone, a tactile actuator (e.g., a vibrating device), control keys, etc.

Communication interface 440 may include hardware or software based logic that allows terminal 110 to communicate with other devices. Implementations of communication interface 440 may include an antenna, a transmitter that may convert baseband signals from processing logic 410 to radio frequency (RF) signals and/or a receiver that may convert RF signals from the antenna to baseband signals. Alternatively, communication interface 440 may include a transceiver that performs the functions of both a transmitter and a receiver. Communication interface 440 may operate with other components, such as processing logic 410, user interface 430 (e.g., a display device) and/or authentication logic 460 when establishing a communication session on behalf of terminal 110.

Communication interface 440 may include near field communication logic that allows terminal 110 to participate in communication sessions over short distances, such as distances up to several feet (e.g., on the order of 30 feet) and far field communication logic that allows terminal 110 to participate in communication sessions over substantially any distance (e.g., communicating with a cell tower that is located several miles away from terminal 110 and/or communicating with a satellite). For example, terminal 110 may receive a query from a radio frequency identification (REID) transmitter on register 140. Terminal 110 may process the signal and communication interface 440 may send information, such as a token that identifies terminal 110, to register 140 via a secure near field communication signal. Terminal 110 may exchange other types of information with server 130 via a far field communication signal. Communication interface 440 may be adapted to send and/or receive communication signals via radio frequency (RF), free-space optical, and/or free-space acoustic waveforms.

Transaction logic 450 may include hardware or software based logic to perform transactions with a device, such as register 140 or server 130. For example, transaction logic 450 may include a transaction application that allows terminal 110 to establish sessions with register 140 and exchange transaction information with register 140 (e.g., item names, quantities, prices, payment information, etc.). Transaction logic 450 may operate with authentication logic 460, communication interface 440, and/or other components in terminal 110 when initiating, participating in, and/or concluding transactions with devices.

Authentication logic 460 may include hardware or software based logic that allows terminal 110 to establish its identity with another device. Authentication logic 460 may include logic that allows terminal 110 to generate an identifier (e.g., token), such as a string of digits that can be used to identify terminal 110 with respect to other devices in system 100, such as register 140. Authentication logic 460 may further allow a user of terminal 110 to enter information, such as a password, PIN, answer to a prompt, etc. to establish an identity of terminal 110.

For example, in an implementation, authentication logic 460 may send a rolling code to a device (e.g., register 140) in response to a query, where the rolling code is adapted to uniquely identify terminal 110 in a way that discourages spoofing by another party, such as a party operating a malicious device (eavesdropper) in system 100. Authentication logic 460 may allow terminal 110 to participate in secure sessions with a device in system 100 when terminal 110 is validated to the device.

In one implementation, authorization logic 460 may include an RFID chip that includes an electronic serial number (ESN). The RFID chip may receive a query from an RFID transceiver (e.g., a reader and a transmitter) and may provide the ESN to register 140 in response to the query, where the ESN uniquely identifies terminal 110. For example, in one implementation, terminal 110 may employ a secure identification value (SIV) that may include an ESN, a secure ID token (e.g., a rolling code), and/or a PIN. Terminal 110 may provide the SIV in response to a query, such as an RFID query and/or another type of near field query (e.g., a Bluetooth query), to identify terminal 110 to the device sending the query.

In another implementation, authentication logic 460 may include a secure identification (secure ID) token that is synchronized with another device, such as server 130. Terminal 110 may provide the secure ID token to register 140 in response to a request, and register 140 may verify the token via the other device (e.g., server 130).

In still another implementation, authentication logic 460 may include an RFID scanner, or another type of scanner, to allow terminal 110 to participate in peer-to-peer secure communication sessions. For example, a peer-to-peer secure communication session may occur when terminal 110 exchanges transaction information with a wireless PDA operated by another user.

Figure 5:
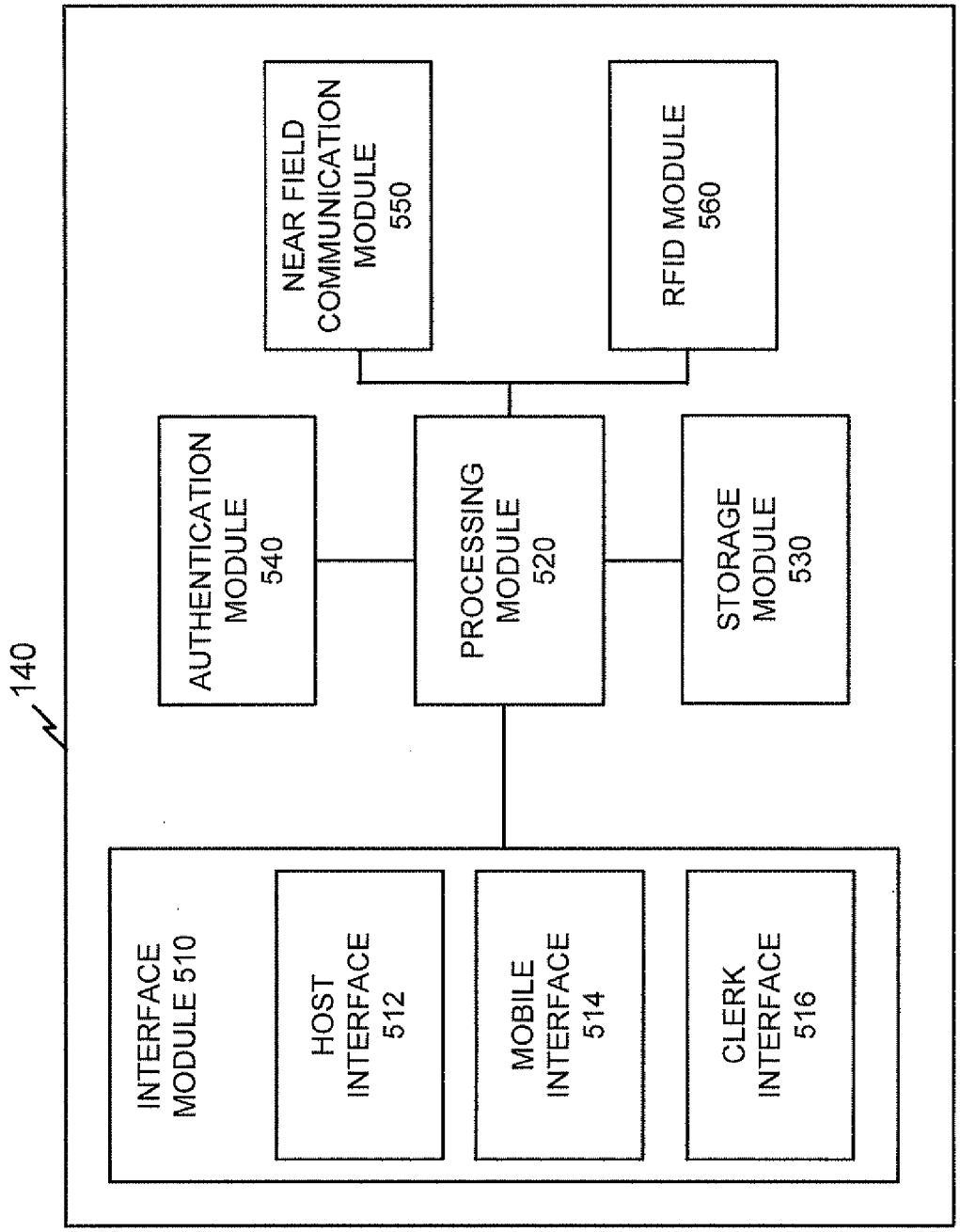
FIG. 5 illustrates an exemplary functional diagram of the register of FIG. 1.

FIG. 5 illustrates an exemplary functional diagram of register 140. An implementation of register 140 may include interface module 510, processing module 520, storage module 530, authentication module 540, near field communication module 550 and radio frequency identification (RFID) module 560. Interface module 510 may include hardware or software based logic to send and/or receive information and may include host interface 512, mobile interface 514, and clerk interface 516. Interface module 510 may send information to or may receive information from another device via secure or non-secure packet based data or non-packet based data. Host interface 512 may include hardware or software based logic that allows register 140 to exchange information with enterprise 150. In an implementation, host interface 512 may connect register 140 to enterprise 150 via a private network, such as a LAN.

Mobile interface 514 may include hardware or software based logic to exchange information with terminal 110. For example, mobile interface 514 may operate with near field communication module 550 to send information to and receive information from terminal 110 during a transaction session. In one implementation, mobile interface 514 may send transaction receipt information to terminal 110 so that the information can appear on a display of terminal 110 during a transaction between terminal 110 and register 140.

Clerk interface 516 may include hardware or software based logic that allows a clerk to interact with register 140. For example, clerk interface 516 may include a keypad, keyboard, or other input device to allow the clerk to input information into register 140, and/or an output device, such as a display device or printer, to provide information to the clerk.

Processing module 520 may include hardware or software based logic to process instructions related to performing transactions with terminal 110, server 130 and/or enterprise 150.

Storage module 530 may include hardware or software based logic to store information related to terminal 110, transactions performed with terminal 110, authentication information about terminal 110, etc.

Authentication module 540 may include hardware or software based logic to authenticate an identity of terminal 110. Authentication module 540 may operate with server 130, enterprise 150 and/or third party 170 when authenticating terminal 110. In one implementation, authentication module 540 may operate with mobile interface 514 to query terminal 110 for identifying information. Register 140 may process identification information received from terminal 110 via authentication module 540 and/or processing module 520. In one implementation, register 140 may send the identifying information to enterprise 150 or server 130 and may receive a result therefrom that indicates whether terminal 110 has been validated.

Near field communication module 550 may include hardware or software based logic to send information to terminal 10 and to receive information from terminal 110 via a near field communication link. Near field communication module 550 may include a near field transceiver that allows register 140 to send information to terminal 110, such as an RFID query, and/or to receive information from terminal 110, such as a token. Near field communication module 550 may be an IEEE 802.x interface and/or another type of interface that can communicate via free space RF, optical, or acoustic waveforms. In one implementation, near field communication module 550 may exchange information with terminal 110 via encrypted packet-based or non-packet based transmissions.

RFID module 560 may include hardware or software based logic to allow register 140 to send information, such as queries, to RFID logic operating in terminal 110. For example, RFID module 560 may be a plug-in module that can be installed on register 140 to allow register 140 to query terminal 110. Register 140 may query terminal 110 when RFID module 560 senses the presence of terminal 110 (e.g., when terminal 110 is moved proximate to a reader related to RFID module 560). The query may initiate an exchange of authentication information between terminal 110 and register 140 to establish a secure, near field communication session with terminal 110.

Figure 6:
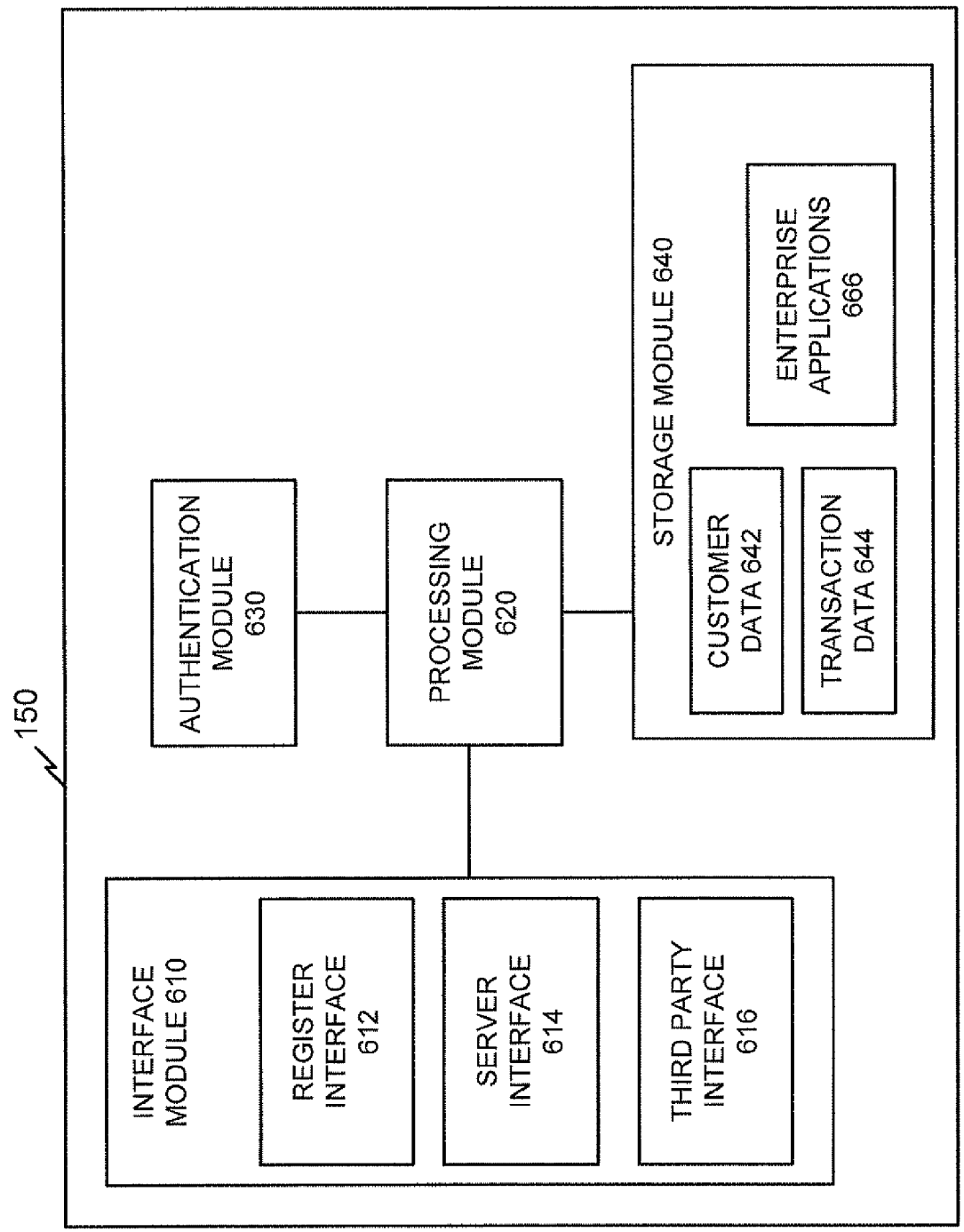
FIG. 6 illustrates an exemplary functional diagram of the enterprise of FIG. 1.

FIG. 6 illustrates an exemplary functional diagram of enterprise 150. An implementation of enterprise 150 may include interface module 610, processing module 620, authentication module 630, and storage module 640. Interface module 610 may include hardware or software based logic to send and/or receive information. Interface module 310 may include a register interface 612, server interface 614, and third party interface 616. Register interface 612 may include hardware or software based logic that allows enterprise 150 to exchange information with register 140. For example, enterprise 150 may exchange customer identifiers, transaction information, time/date information, payment information, frequent shopper card information, etc., with register 140 via register interface 612.

Server interface 614 may include hardware or software based logic that allows enterprise 150 to communicate with server 130. For example, server interface 614 may be a network interface card (NIC) that allows enterprise 150 to establish secure or non-secure communication sessions with server 130. Third party interface 616 may include hardware or software based logic that allows enterprise 150 to exchange information with third party 170. Implementations of third party interface 616 may allow enterprise 150 to exchange encrypted or non-encrypted information with third party 170. In one implementation, enterprise 150 may receive a report containing mined data results from third party 170 over third party interface 616.

Processing module 620 may include hardware or software based logic to process instructions related to performing transactions with terminal 110, server 130 and/or third party 170, authenticating terminal 110, sending and/or receiving mining information to/from server 130, etc. Processing module 620 may be implemented in a standalone or distributed configuration, such as by being distributed across one or more devices.

Authentication module 630 may include hardware or software based logic to authenticate an identity of terminal 110 to register 140 and/or enterprise 150. Authentication module 630 may operate with server 130 and/or third party 170 when authenticating terminal 110. For example, enterprise 150 may receive tokens, passwords, PIN validation, etc., from an authorization component operating in server 130. Enterprise 150 may use the received information to authenticate terminal 110 on behalf of register 140.

Storage module 640 may include hardware or software based logic to store information related to terminal 110, register 140, transactions, payments, inventories, account information, mining results, authentication information, etc. In an implementation, storage module 640 may include customer data 642 that identifies customers related to terminals 110, transaction data 644 that may include information related to transactions performed on behalf of terminal 110 and/or enterprise 150, and enterprise applications 666 that may include applications run in enterprise 150 to perform operations in enterprise 150, such as operating a number of registers 140, exchanging information with server 130, processing mining results received from server 130/third party 170, etc.

Figure 7A:
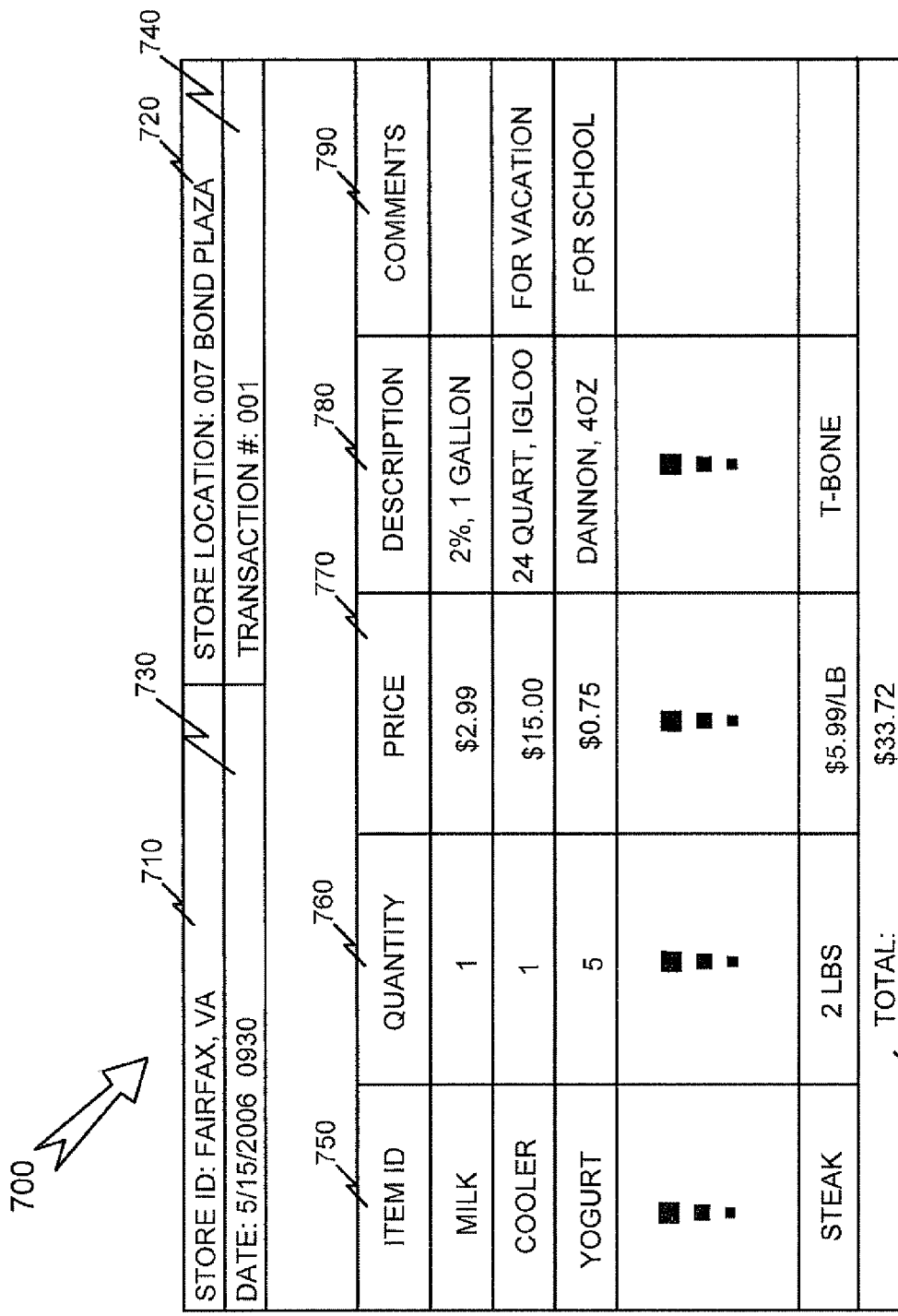
FIG. 7A illustrates an exemplary data structure to store transaction information.

FIG. 7A illustrates an exemplary data structure 700 to store transaction information. Data structure 700 may include information arranged in a row by column format to facilitate use by an individual, such as a clerk or customer. Data structure 700 may reside in terminal 110, register 140, server 130, enterprise 150, etc. The implementation of data structure 700 discussed in connection with FIG. 7A is exemplary and other implementations of data structure 700 are possible. Other implementations of data structure 700 may include more fields or fewer fields.

An implementation of data structure 700 can include store ID 710, store location 720, date 730, transaction number 740, item ID 750, quantity 760, price 770, description 780, comments 790, and total 791. Store ID 710 may include information that identifies an entity that is involved in a transaction related to data structure 700. Store ID 710 may include a name, number, or other identifier.

Store location 720 may include information that identifies a location where a transaction related to data structure 700 takes place. For example, store location 720 may include an address of an establishment involved in a transaction with a customer. Date 730 may include information that identifies a date and/or time when a transaction occurred and/or when data structure 700 was created, modified, stored, etc. Transaction number 740 may include information that identifies a transaction. For example, a transaction number may be used to identify a receipt that includes descriptions of items purchased during a transaction.

Item ID 750 may include information that identifies an item or service purchased, exchanged, or otherwise related to a transaction. For example, item ID 750 may include names of items purchased during a transaction. Quantity 760 may include information that identifies a number of items related to item ID 750 and/or price 770.

Price 770 may include information that identifies a cost related to an item identified by item ID 750. Description 780 may include information that describes an item identified by item ID 750. Comments 790 may include information related to an item identified by item ID 750. For example, comments 790 may include information about a size, color, or shape of a purchased item, description of what an item is to be used for, information about rebates, etc.

Total 791 may include information that identifies a totaled value for data structure 700. For example, total 791 may include a value that represents the cost of items 750 included in data structure 700.

FIG. 7B illustrates an exemplary receipt that can be displayed via terminal 110 or register 140. In one implementation, receipt 792 may be generated from information in data structure 700. Receipt 792 may be an electronic receipt displayed on a device, such as a display on terminal 110 or register 140, and/or may be a hard copy receipt (e.g., a paper receipt). Receipt 792 may include store ID 710, location 720, date 730, transaction number 740, item ID 750, quantity 760, description 780, total 791 and store name 793. Store ID 710, location 720, date 730, transaction number 740, item ID 750, quantity 760, description 780, and total 791 may be as described in connection with FIG. 7A. Store name 793 may include information that identifies a store, such as a store name, number, or other type of identifier. In one implementation, register 140 may mirror information included in receipt 792 onto a display of terminal 110 during a transaction.

FIG. 8 illustrates an exemplary data structure 800 to store customer and transaction information on a server. Data structure 800 may include information arranged in a row by column format to facilitate use by an individual, such as an administrator, a store manager, an accountant, or an analyst performing data mining activities on behalf of server 130, enterprise 150, etc. Data structure 800 may reside on server 130, enterprise 150, third party 170, etc. The implementation of data structure 800 discussed in connection with FIG. 8 is exemplary and other implementations of data structure 800 are possible. For example, other implementations of data structure 800 may include more fields or fewer fields.

Data structure 800 may include enterprise ID 810, location 820, date 830, other information 840, customer ID 850, transaction ID 860, authorization ID 870, valid field 880, link field 890, and authorization date/time 895. Enterprise ID 810 may include information that identifies an enterprise 150 related to information in data structure 800. For example, enterprise ID 810 may include information that identifies a store that conducted transactions with customers identified via customer ID 850. Location 820 may identify a location where transactions with customers identified by customer ID 850 occurred. For example, location 820 may identify an address of a store where transactions identified by transaction ID 860 took place. Date 830 may include information that identifies a date when data structure 800 was created, modified, saved, etc. Other information 840 may include information related to entries in data structure 800. For example, other information 840 may include the name of a manager that was on duty at a store location identified via location 820, such as a store location where transactions in transaction ID 860 occurred.

Customer ID 850 may include information that identifies one or more customers that participated in a transaction identified via transaction ID 860. Customer ID 850 may include a name, number, or other identifier. Transaction ID 860 may include information that identifies a transaction involving a customer identified via customer ID 850 and/or an enterprise identified by enterprise ID 810. Transaction ID 860 may correspond to transaction number 740 (FIG. 7A) in one implementation. Other implementations of transaction ID 860 may include other information.

Authorization ID 870 may include information that identifies whether a customer identified via customer ID 850 is authorized to participate in a transaction. For example, authorization ID 870 may include information that identifies a token used to authenticate and/or authorize a customer and/or file that includes information related to authorizing a terminal 110.

Valid field 880 may include information that identifies whether an authorization related to a customer identified via customer ID 850 is valid. Valid authorizations may allow a customer to participate in transactions using terminal 110, while an invalid authorization may prevent the customer from participating in transactions using terminal 110. Link field 890 may include information that identifies a link related to entries in data structure 800. For example, link L−1 may couple information about demographics related to B. Smith to transaction 001. Authorization date/time 895 may include information that identifies a date and/or time on which a transaction was authorized and/or took place.

FIG. 9 illustrates an exemplary data structure 900 to store transaction information that can be used for data mining. Data structure 900 may include information arranged in a row by column format to facilitate use by an individual, such as an analyst performing data mining activities. Data structure 900 may reside on server 130, enterprise 150, third party 170, etc. The implementation of data structure 900 discussed in connection with FIG. 9 is exemplary and other implementations of data structure 900 are possible. For example, other implementations of data structure 900 may include more fields or fewer fields.

Data structure 900 may include customer ID 850, date 920, retailer ID 930, transaction ID 860, transaction date/time 950, items 960, tracking data 970 and other information 980. Customer ID 850 may identify a customer and date 920 may identify a date and/or time when data structure 900 was created, modified, saved, etc. Retailer ID 930 may include information that identifies a store that participated in a transaction with a customer identified via customer ID 850. Transaction ID 860 may identify a transaction involving the customer identified via customer ID 850.

Transaction date/time 950 may include information that identifies a date and/or time on which a transaction identified via transaction ID 860 took place. Items 960 may include information that identifies one or more items purchased, exchanged, etc., during a transaction identified via transaction ID 860. In an implementation, items 960 may include a link to another data structure or file that may include other items related to a transaction. For example, K–1 may refer to a file that includes information about all items purchased during a transaction (e.g., transaction ID: 001, FIG. 7B), such as quantities, item names, prices, method of payment, etc.

Tracking data field 970 may include information that identifies whether tracking information related to a customer identified via customer ID 850 is available. For example, a customer may have answered a questionnaire about his/her purchasing habits, household income, etc., when enrolling in a rewards program that compensates the customer for allowing his/her purchasing information to be mined. The information provided by the customer may be user data that includes tracking data to allow the customer's purchases to be tracked with a degree of precision. Tracking data field 970 may include "yes" when the customer has provided tracking data and/or when tracking data has been obtained on behalf of the customer, such as with the customer's consent or via another device.

Other information 980 may include information related to other entries in data structure 900. For example, other information 980 may indicate whether a transaction was made within a customer's normal shopping area, in person, via a phone, via the web, etc.

Figure 10:
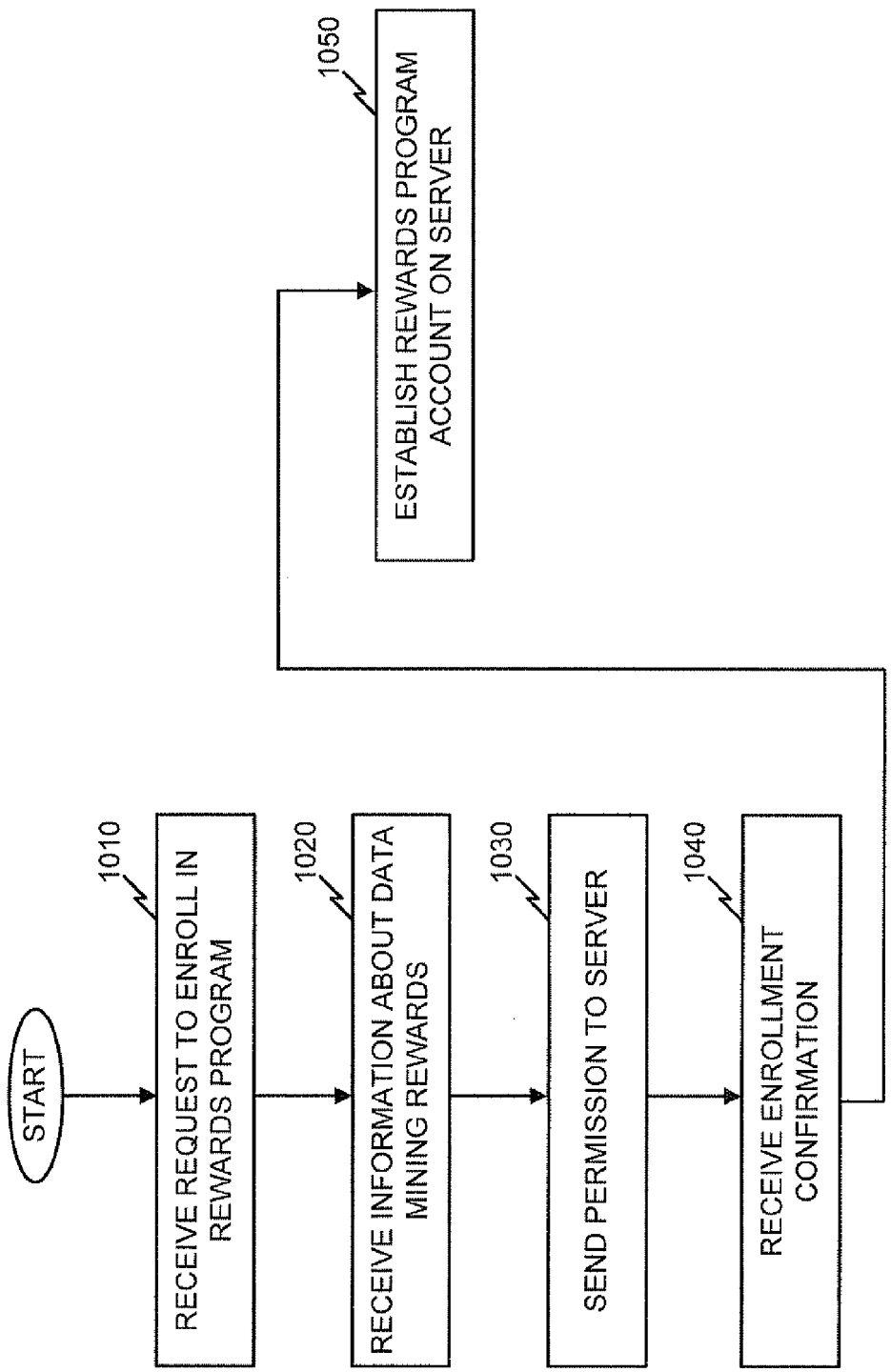
FIG. 10 illustrates an exemplary process for enrolling a mobile terminal in a rewards program on a server.

FIG. 10 illustrates an exemplary process for enrolling terminal 110 in a rewards program with server 130. An entity, such as a communications provider, may offer wireless device users the ability to earn rewards for allowing mining of information about users' purchasing activities. For example, the provider may offer a user of terminal 110 cash, rebates on monthly service bills, store credits, prizes and/or other things that may be of value. For example, the provider may offer terminal 110 free downloads of ring tones, songs, movies, code (e.g., game applications), and/or other content. The provider may send information about the rewards program to mobile terminal users, such as subscribers of wireless communication services offered by the provider.

A user may receive a request to enroll in a rewards program (block 1010). For example, a user may receive an enrollment offer via his/her terminal 110. The user may request additional information about the program, such as details describing how the program works and/or types of rewards available to program participants. The user may receive information about data mining rewards via terminal 110 (block 1020). For example, server 130 may send terminal 110 a schedule of rewards that identifies the types of rewards available to users. For example, a first type of reward may be available to users that allow the use of transaction information that does not include information that identifies the user (e.g., user identity information is removed from the transaction information). A second, more valuable, type of reward may be available to a user that allows the use of transaction information that includes information that identifies the user.

The user may decide to enroll in the rewards program and may send his/her permission to server 130 (block 1030). For example, the user may complete an online enrollment form via a web enabled terminal 110 and/or may enroll by speaking with an operator and/or may complete a hardcopy questionnaire. Server 130 may process the enrollment information and may generate a confirmation.

Terminal 110 may receive enrollment confirmation (block 1040). For example, server 130 may send token generating code to terminal 110 and/or may send a confirmation message to terminal 110. Server 130 may establish an account on behalf of terminal 110 (block 1050). A user of terminal 110 may participate in the rewards program when he/she is enrolled therein.

Users may enroll in a rewards program without using terminal 110. For example, users may enroll in the rewards program via a desktop computer, a laptop computer, a PSTN device, in person, via postal mail, etc. Assume, for sake of example, that a user of terminal 110 receives an enrollment form in the mail. The user may enroll in the rewards program by completing the questionnaire and mailing the completed questionnaire back to an entity related to the rewards program.

Server 130 may send code (e.g., software) to terminal 110 when the user enrolls in the data mining program. For example, server 130 may upload software to terminal 110 that allows terminal 110 to participate in near field communication sessions with register 140, which allows terminal 110 to generate tokens for use in establishing authorized sessions with register 140, etc.

Figure 11:
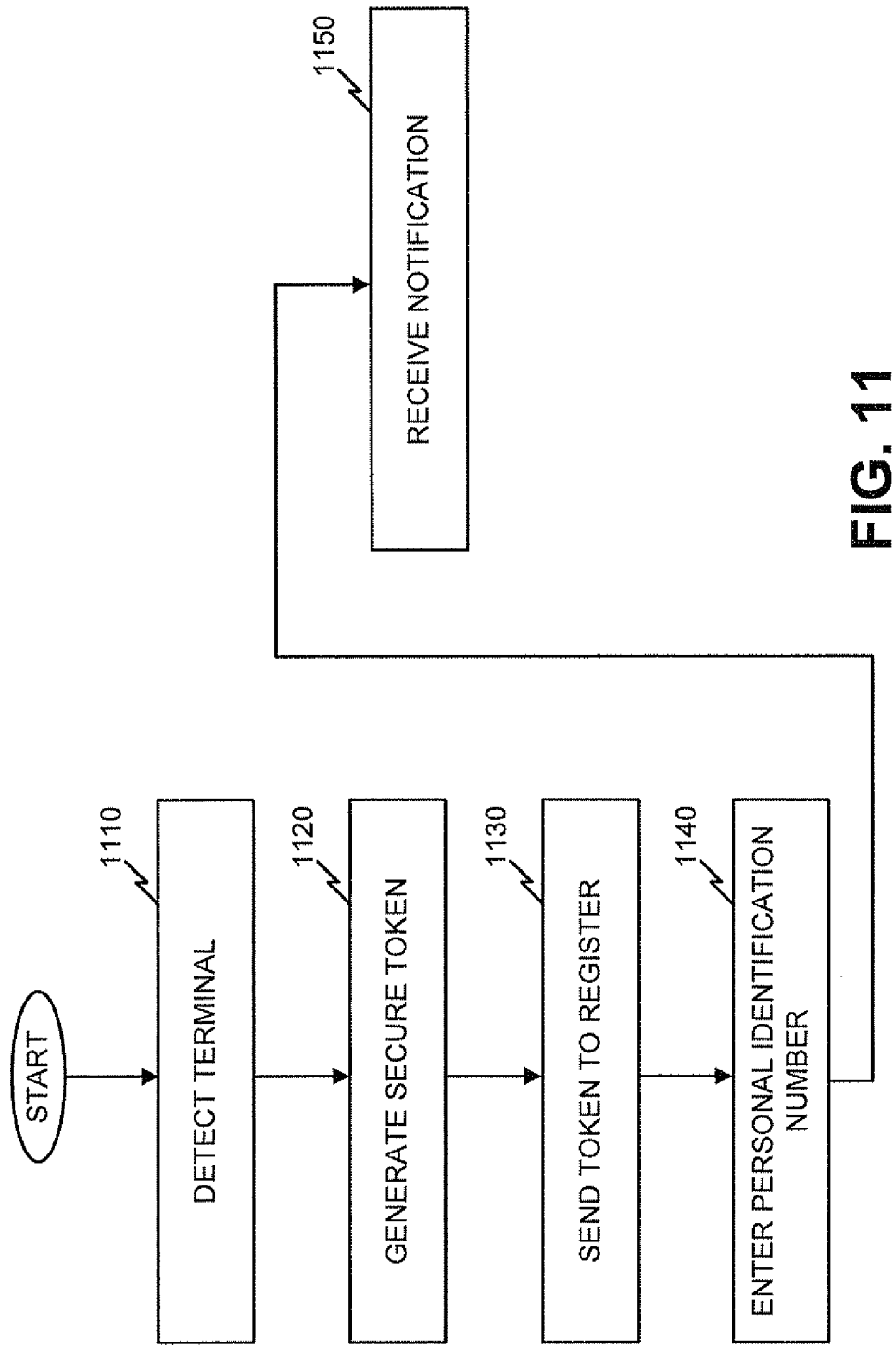
FIG. 11 illustrates exemplary processing to authenticate a transaction.

FIG. 11 illustrates exemplary processing to authenticate a transaction. A user that is enrolled in the rewards program may earn rewards by participating in transactions, such as purchase transactions with register 140. Register 140 may authorize terminal 110 prior to allowing terminal 110 to participate in a transaction. For example, a user may shop in a retail store while carrying terminal 110. When the user desires to check out at the store, the user may swipe or bring terminal 110 proximate to a reader connected to register 140. The reader may authenticate terminal 110 when terminal 110 is detected (block 1110). For example, terminal 110 may include an RFID chip that is sensed by an REID reader connected to register 140. In one implementation, the RFID reader may be part of RFID module 560 (FIG. 5) and may query terminal 110 upon sensing terminal 110.

Terminal 110 may generate a secure token in response to a query received from register 140 (block 1120). For example, terminal 110 may include logic, such as authentication logic 460, to generate a token using a seed. For example, terminal 110 may use a time value received from wireless network 120 as a seed and may run code to generate a pseudo-random number based on the seed. The pseudo-random number may act as a token for transactions between terminal 110 and another device, such as register 140.

Terminal 110 may send the token to register 140 (block 1130). For example, terminal 110 may send the token to register 140 via a secure near-field link, such as a Bluetooth connection. In one implementation, terminal 110 may send other information, such as an ESN encoded into terminal 110, to register 140 along with the token, or in lieu of the token.

A user of terminal 110 may enter a PIN into terminal 110 via a keypad or other input device (block 1140). The PIN may be adapted to supplement the token and/or ESN to establish an identity of terminal 110. Terminal 110 may send the PIN to register 140 via communication interface 440. Alternatively, a user of terminal 110 may face a display of terminal 110 toward a clerk operating register 140 so that the clerk may read information on the display (e.g., an ESN, token value, PIN, etc.) and may enter the information into register 140. This alternative implementation may be use with implementations of register 140 that do not include an RFID transceiver and/or in implementations where an RFID transceiver is inoperable.

Register 140 may send the token, ESN and/or PIN to enterprise 150 via host interface 512, and enterprise 150 may forward the token, ESN and/or PIN to server 130 via network 160. In one implementation, server 130 may maintain information related to information used by terminal 110 to generate the token. For example, server 130 may maintain a time value that is synchronized to a time value on terminal 110 (e.g., by running a master clock for wireless network 120) and may use the same code (e.g., computer implemented algorithm) to generate a token copy that matches the token generated by terminal 110.

Assume, for sake of example, server 130 operates a master clock that sends time values to devices on wireless network 120, such as terminal 110. Server 130 may generate a token copy using a master clock value. Server 130 may compare the token copy to the token received from enterprise 150 and may determine whether the token received from enterprise 150, on behalf of terminal 110, is from a valid terminal 110. In one implementation, matching tokens/token copies may indicate that terminal 110 is a legitimate device that is operated by a subscriber enrolled in a rewards program/data mining service provided by server 130. Server 130 may use a PIN and/or ESN to further establish the identity of terminal 110. For example, server 130 may use an ESN to identify an algorithm (code) that should be used to generate the token copy based on the master clock value.

Server 130 may send a notification to register 140 via enterprise interface 312 that indicates whether terminal 110 is authorized to participate in a transaction with register 140. Terminal 110 may receive a forwarded notification from register 140 via communication interface 440 (block 1150). Terminal 1110 and register 140 may be allowed to participate in a secure transaction session when terminal 110 is validated using server 130.

Figure 12:
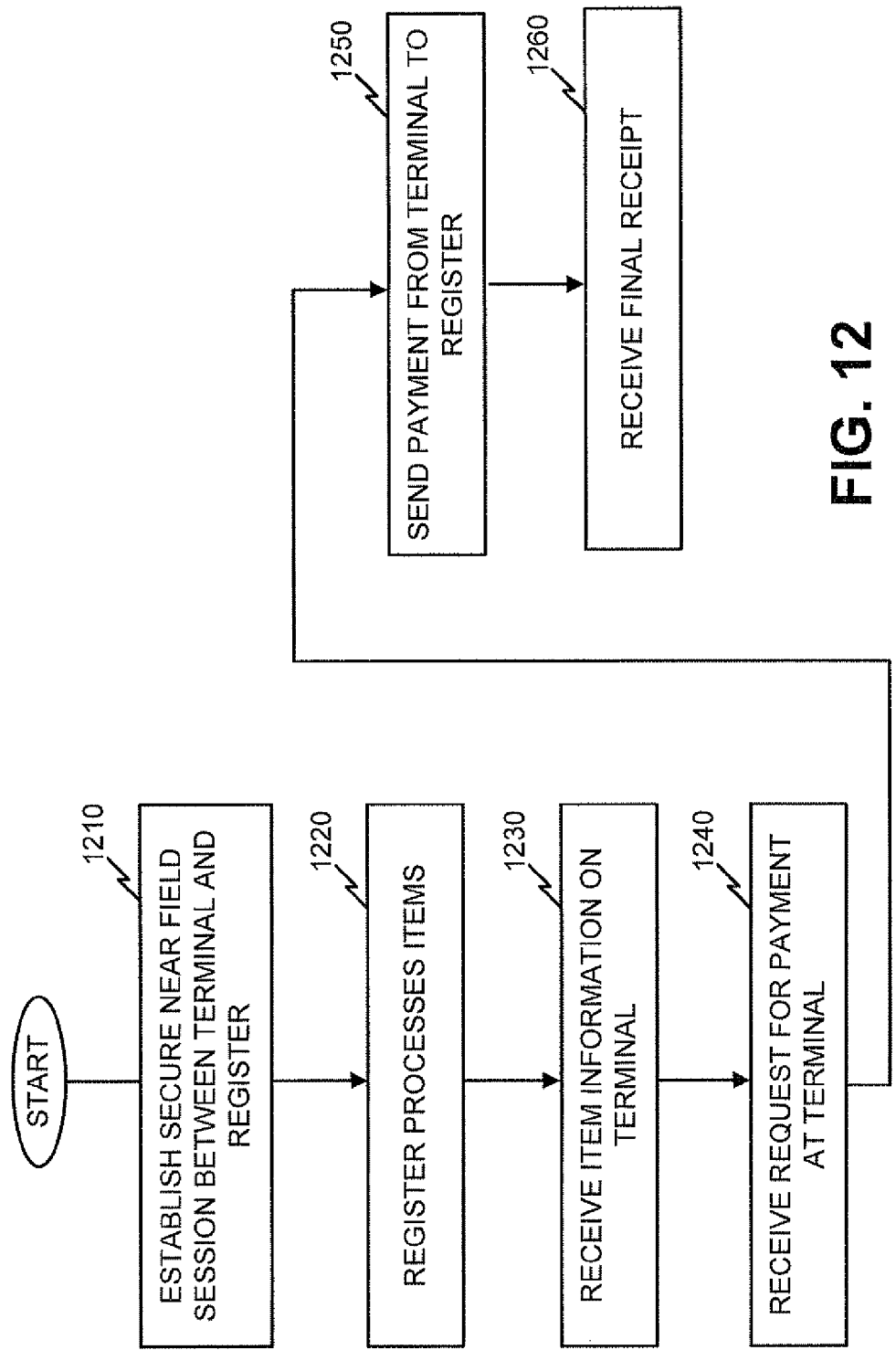
FIG. 12 illustrates exemplary processing for a transaction.

FIG. 12 illustrates exemplary processing for a transaction, such as a purchase transaction. Terminal 110 and register 140 may establish a secure near-field communication session (block 1210). In one implementation, terminal 110 and register 140 may establish the secure near-field communication session after performing the authentication process illustrated in FIG. 11.

Register 140 may process items purchased by a user of terminal 110 (block 1220). For example, a clerk may run bar coded items past a bar code reader connected to register 140 to register an item, a quantity for the item, and a price of the item on register 140. Register 140 may print information about scanned items on a paper receipt, may display information about scanned items on a register display, and/or may store information about scanned items in storage module 530.

Terminal 110 may receive information about scanned items via the near-field communication session (block 1230). In an implementation, register 140 may mirror data rendered on a register display to a display device in terminal 110. For example, if the register display shows "Oreo one pound package, quantity 1, price: $2.99," a display device on terminal 110 may display the same information. The display device on terminal 110 may be updated whenever the register display is updated, such as when another item is scanned.

Terminal 110 may store transaction information received from register 140 in storage 420. The stored information may act as a virtual receipt in terminal 110. Terminal 110 may receive a request for payment once all items have been recorded by register 140 (block 1240). For example, register 140 may send information identifying a total amount due to terminal 110.

Terminal 110 may send payment to register 140 (block 1250). In an implementation, a user of terminal 110 may select a payment type (e.g., ATM card, credit card, gift card, cash, etc.) and may send payment information to register 140. Register 140 may process the payment information, such as by contacting a server operated by an institution issuing a credit card. Register 140 may send a final receipt to terminal 110 when a transaction is completed (block 1260). The final receipt may include final transaction information that identifies all items and/or other information related to the transaction. In one implementation, the final receipt may be similar to receipt 792. Terminal 110 may store the final receipt in storage 420.

Register 140 may send transaction information to another device, such as enterprise 150 and/or server 130 for archiving. Archived transaction information may be retrieved from storage using, for example, a transaction number, when a data mining application is run against archived transaction information. Archived transaction information may be stored in terminal 110, register 140, enterprise 150, server 130, etc. via data structure 700. Information for a number of transactions, such as transactions conducted with enterprise 150 during a determined interval, e.g., during a shopping day, may be stored in server 130 or enterprise 150 via data structure 800.

Information related to one or more transactions may be used for data mining. For example, server 130 may provide a managed service to enterprise 150, where the managed service entitles enterprise 150 to receive monthly reports that include mined data. The mined data may be obtained from one or more data structures 800 stored on server 130 and may include transaction information related to a number of terminals 110, registers 140, enterprises 150, etc.

Figure 13:
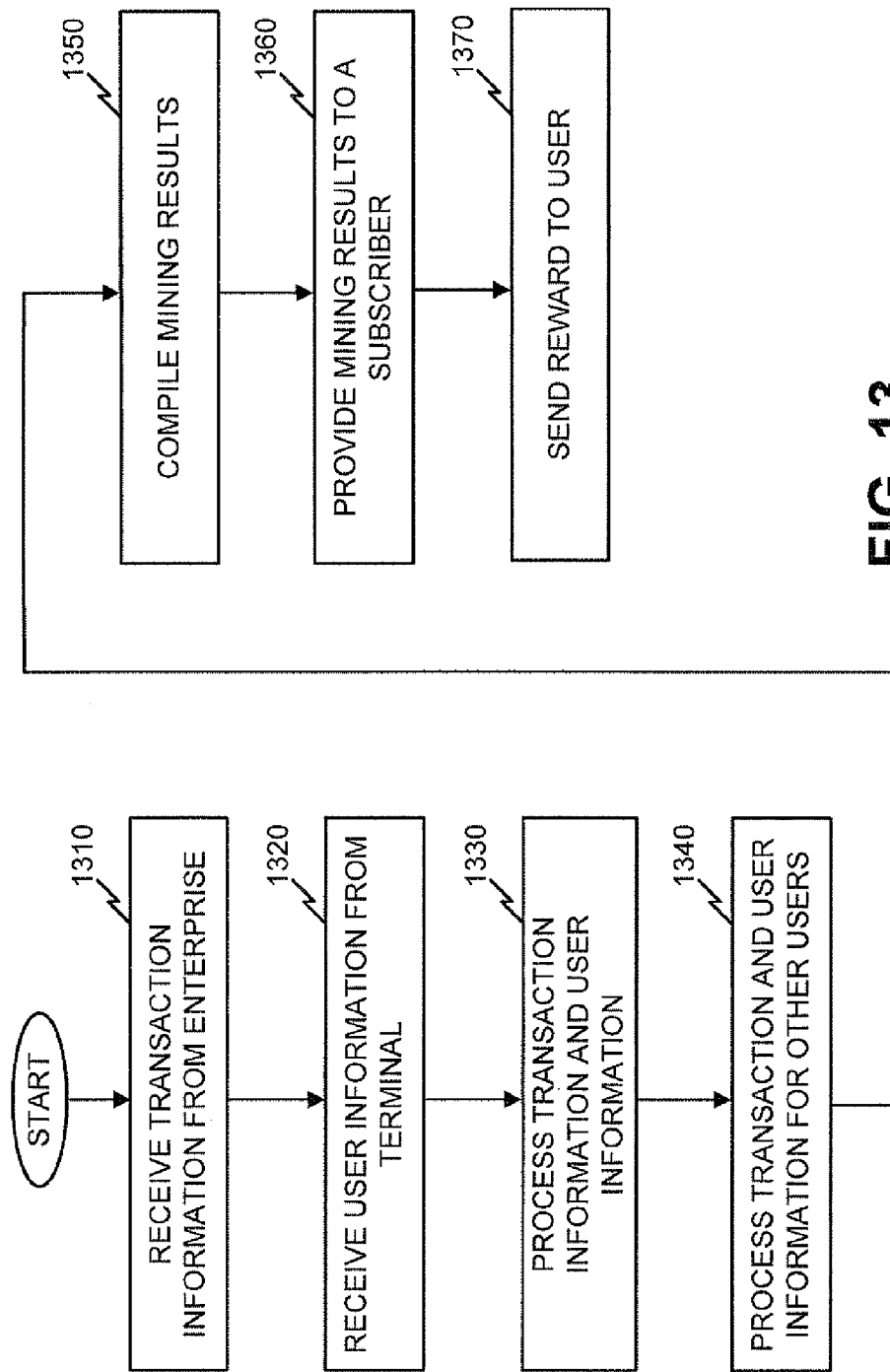
FIG. 13 illustrates exemplary processing for mining transaction information.

FIG. 13 illustrates exemplary processing for mining transaction information from a data structure. Server 130 may receive transaction information from register 140 and/or enterprise 150 (block 1310). For example, server 130 may receive an electronic receipt from a transaction device (e.g., register 140) that identifies a store, one or more terminals 110, dates/times of transactions, items purchased, payment methods, transaction numbers, etc. Server 130 may store the information in storage module 350, e.g., in transaction information 353.

Server 130 may receive user information and/or transaction information from terminal 110 (block 1320). For example, terminal 110 may send information that identifies terminal 110 to server 130, such as authentication information exchanged with register 140 during the transaction and/or another type of identifier. Terminal 110 may also send its copy of the transaction (e.g., an electronic receipt) to server 130 so that server 130 can match the receipt received from terminal 110 with the receipt received from register 140 (e.g., by comparing transaction numbers on the two receipts). Terminal 110 may her send information that may be useful to server 130 when performing data mining operations, such as information about a route taken by a user of terminal 110 to the store where the transaction took place, information about other stores visited by the user before making a purchase at register 140, local weather information, household income information, etc. Server 130 may store this other information in user information 351, transaction information 353, etc. For example, server 130 may receive global positioning system (GPS) data from terminal 110, where the GPS data identifies where terminal 110 stopped (e.g., other stores) en route to enterprise 150 where terminal 110 made a purchase. Server 130 may further receive other types of information from other sources, such as local weather stations, news agencies, government agencies, other data mining devices/services, etc.

Server 130 may process transaction information and user information (block 1330). Server 130 may run a data analysis and/or data mining applications to process transaction information and user information for terminal 110. Server 130 may produce a result (e.g., a result file) that contains outputs from applications run against the transaction information and the user information for terminal 110.

Server 130 may process transaction information, user information, and/or other information obtained from and/or related to other mobile terminals 110 and/or registers 140 (block 1340). For example, a retail chain may operate a number of store locations and each location may provide its transaction data to server 130 for transactions that take place with users of terminals 110 therein. Server 130 may receive this transaction information and may further obtain user information from customers related to these transactions. For example, server 130 may retrieve user information from storage devices in terminal 110 (e.g., GPS data, calendar entries, etc.). Server 130 may process information from these customers and/or transactions using software applications, such as data mining applications.

Server 130 may compile data mining results for one or more users of terminal 110 (block 1350). For example, data mining results can be generated on behalf of a store, where the results include information for a number of customers using terminals 110 at the store. Alternatively, a retailer may desire results for a single customer in order to determine if promotional rewards should be offered to that customer, such as coupons for certain types of merchandise and/or services. For example, server 130 may generate data structure 900 via mining module 330 and/or processing module 320, where data structure 900 includes information for a number of transactions made by terminal 110.

Server 130 may send data mining results to a subscriber (block 1360). For example, server 130 may send data mining results for one or more customers, to a retailer that uses registers 140, and/or to a manufacturer that makes products similar to a product purchased by one or more users of terminals 110.

In one implementation, server 130 may send data structure 900 to subscribers via interface module 310. Subscribers may use data mining results to create marketing programs and/or materials (such as sales fliers), to determine future manufacturing requirements for certain products, to determine re-stocking requirements for merchandise at retail locations, to identify changes in customer preferences for products or services, etc.

Subscribers may benefit from data mining results produced by server 130, because server 130 uses actual data obtained from one or more transactions to produce data mining results. Therefore, data mining results produced by server 130 may not include erroneous transaction data, such as might occur when a customer provides transaction information recalled from his/her memory to a polling company. Server 130 may provide the mining results to subscribers as part of a managed service, such as a service that provides subscribers with monthly reports of customer activities. Server 130 may bill the subscribers for the managed service on a periodic basis (e.g., monthly) and/or on other terms (e.g., per report).

Server 130 may send a reward to a user of terminal 110 (block 1370). For example, a rewards program operated by server 130 on behalf of subscribers (e.g., enterprise 150 and/or third party 170) may provide users of terminal 110 with rewards when the users provide transaction information and/or user information to server 130.

Rewards may be offered on a tiered basis, such as by offering rewards of greater value when a user allows greater detail about his/her transactions to be obtained/used by server 130. For example, a rewards program may have a first tier, or level, that provides users with a coupon when the users agree to provide transaction data that does not identify the users, i.e., information identifying a user/terminal 110 is stripped from the transaction information. The rewards program may have a second tier that provides users with free music downloads when users agree to provide transaction information that includes information identifying the users. A third tier may provide users with cash or store credit when users agree to provide transaction information that identifies the users and where the users further agree to provide user information that can be used to enhance the usefulness of the transaction information to entities (e.g., subscribers) that use mined data.

Substantially any number of reward levels may be used and rewards may include anything that may be of value to a user of terminal 110. For example, rewards may include cash, credits, merchandise, services, discounts on service plans or products, coupons, special treatment (e.g., by allowing customers to use faster check out lanes, use preferred parking spots proximate to a store, attend special events, etc.), etc.

Implementations described herein have been directed to purchasing transactions that involve terminal 110 and register 140. Implementations described herein may be used in other applications and/or transactions, such as mining information about an individual from a database to verify the identity or age of that individual. For example, terminal 110 may be operated by a user that wishes to buy liquor. A merchant may request information identifying the user via an RFID query to terminal 110. Terminal 110 may send a message to register 140 or to server 130 that identifies terminal 110 and the type of transaction. Register 140 and/or server 130 may contact a state department of motor vehicles and may download a copy of the user's driver's license. Server 130 may send the driver's license information to register 140 operated by the liquor store, or register 140 may receive the information directly from the department of motor vehicles. A clerk at the liquor store may see a picture of the user along with the user's date of birth. The clerk may sell liquor to the user when the user's identity is validated.

In another implementation, terminal 110 may be carried by a traveler in an airport. Metal detectors at the airport may send an RFID query to terminal 110 carried by the traveler. Terminal 110 may send identifying information to server 130 (e.g. a server operated by a department of motor vehicles) and server 130 may send the traveler's driver's license information to a computer terminal operated by airport security. The operator may view the traveler's driver's license on a display. The operator may allow the traveler to board a departing plane when the traveler is identified as being legitimate. In still another implementation, the traveler's driver's license photograph and/or the traveler's facial features may be scanned and provided to other systems/applications, such as a facial feature extraction application. The facial feature extraction application may mine information about the traveler from a database when the traveler's facial features are similar to features of suspects in the database.

Still another implementation law enforcement personnel may mine data from one or more databases. For example, a police officer may query terminal 110 for information about a user of terminal 110. Assume that terminal 110 is equipped to respond to a first RFID query and to a second REID query. The first RFID query may be a low power query, such as a query sent from register 140 to terminal 110 during a purchase transaction. The second RFID query may be a high power query that causes terminal 110 to transmit identifying information via a signal that is more powerful than a signal used in response to the first RFID query. Further assume that a police officer is following a vehicle that is believed to be related to a crime. The officer may send the second RFID query to the vehicle as the officer follows the vehicle. Terminals 110, inside the vehicle, may send identifying information to the officer without requiring that users of terminals 110 enter PINs or other types of information. The officer may use identifying information received from terminals 110 to mine data from one or more databases. For example, the officer may query a drivers' license database or criminal database using information obtained from terminals 110, such as ESNs related to terminals 110. The officer may receive images of persons related to terminals 110 along with names, addresses, criminal histories, etc. The officer may further be able to dial one of the terminals 110 to inform occupants of the vehicle that they should comply with the officer's instructions to avoid possible injury.

Yet another implementation may allow an officer to download a suspects driver's license information from a department of motor vehicles database or other information from a criminal database when the suspect is stopped, e.g., for a moving violation. An officer may further query a suspect's cell phone and may mine data from a number of databases to identify the suspect when the suspect is processed at a police station subsequent to arrest.

Still another implementation may be used by an entity, such as a corporation. Assume that a corporation provides its employees with terminals 110. Further assume that the corporation places RFID transceivers at entrances staffed by security personnel. Employee terminals 110 may be queried when the employees enter or exit the corporation and the employees' pictures and other identifying information may be displayed for the security personnel. The security personnel may verify identities of employees based on the displayed information. The corporation may further use RFID transceivers to track movements of employees within buildings owned by the corporation. The corporation may further mine information from employee terminals 110, such as by obtaining receipts for company travel from terminals 110. The corporation may use mined data to negotiate discounts with car rental agencies, hotels, airlines, etc.

Other alternative implementations may take other forms without departing from the spirit of the invention.

CONCLUSION

Implementations may allow accurate transaction data to be mined on behalf of mobile device users. Mined data may be used to reward consumers, to determine marketing campaigns, to monitor inventories, to track users of mobile terminals, to identify users of mobile terminals, to enhance facility security, etc.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than a restrictive sense.

For example, implementations can be implemented using devices and configurations other than those illustrated in the figures and described in the specification without departing from the spirit of the invention. Devices and/or components may be added and/or removed from the implementations of FIGS. 1-6 depending on specific deployments and/or applications. Further, disclosed implementations may not be limited to any specific combination of hardware, software and/or firmware. In addition, while a series of acts has been described with respect to FIGS. 10-13 the order of acts in FIGS. 10-13 may be varied in other implementations. Moreover, non-dependent acts may be implemented in parallel.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A managed service, comprising:
    first logic to:
        provide, via a first network, authentication information to a device on behalf of a mobile terminal to identify the mobile terminal for a near field transaction with the device,
        receive, via the first network and based on the authentication information, transaction information associated with the near field transaction sent from the device, where the transaction information is produced by the device on behalf of the mobile terminal and contains a particular amount of detail with respect to the near field transaction that corresponds to a selected reward level, of a plurality of reward levels, of a data mining rewards program in which a user of the mobile terminal is enrolled, and
        receive, via a second network, user information via the mobile terminal, the user information identifying characteristics of the user of the mobile terminal in the particular amount of detail corresponding to the selected reward level; and
    second logic to:
        produce a result that comprises information mined from at least one of the transaction information or the user information, where the result identifies characteristics of at least one of the transaction or the user.

2. The managed service of claim 1, wherein the first logic is to:
    send an identifier to the mobile terminal used to establish an identity to the device.

3. The managed service of claim 1, wherein the first logic is to:

provide a seed to the mobile terminal, the seed to generate identifying information used by the device with the authentication information to identify the mobile terminal.

4. The managed service of claim 1, wherein the second logic is to:
 store transaction information on behalf of the mobile terminal or the device.

5. The managed service of claim 1, wherein the first logic is to:
 provide information to the mobile terminal via a wireless network.

6. The managed service of claim 1, wherein the first logic is to:
 send a reward to the mobile terminal, where the reward is sent in response to receiving the transaction information.

7. The managed service of claim 1, further comprising:
 third logic to:
  send the result to a receiving device where the receiving device makes a determination with respect to at least one of the mobile terminal, the user, another mobile terminal, or another user based on the result.

8. The managed service of claim 7, wherein at least one of the mobile terminal, the device, or the receiving device subscribe to the managed service.

9. The managed service of claim 7, wherein the first logic, the second logic, and the third logic are operated by a communication provider.

10. A device, comprising:
 first logic to:
  exchange transaction item information with a handheld device, via a near field communication link, to generate completed transaction information;
 second logic to:
  selectively remove portions of the completed transaction information based on a particular reward level, of a plurality of reward levels, of a data mining rewards program in which a user of the handheld device is enrolled, to produce modified completed transaction information, and
  exchange the modified completed transaction information with a destination device via a network, the destination device running a data mining application to process at least a portion of the modified completed transaction information ; and
 processing logic to:
  process authentication information that identifies the handheld device,
  process an authorization related to the handheld device to validate the identity of the handheld device, the authorization based on the authentication information,
  process transaction items on behalf of the handheld device, and
  present the transaction item information to the handheld device, where the transaction item information is displayed on the handheld device during the transaction to substantially mirror transaction item information displayed on the device.

11. The device of claim 10, wherein the processing logic is configured to:
 process a token, a personal identification number, a watermark, a name, an address, a phone number, a serial number, or code received from the handheld device as part of the authentication information.

12. The device of claim 10, wherein the first logic is configured to:
 initiate the exchange with the handheld device by sending a radio frequency identification (RFID) query to the handheld device over the near field communication link.

13. The device of claim 10, wherein the second logic is configured to:
 exchange authentication information, authorization information, transaction information, completed transaction information, or other information with an enterprise or the destination device.

14. The device of claim 10, wherein the authorization is provided to the device via a managed service related to the destination device.

15. A method, comprising:
 receiving an authentication request from a transaction device on behalf of a mobile device;
 providing an authorization to the transaction device to facilitate a near field transaction between the mobile device and the transaction device over a near field link;
 receiving transaction information from the transaction device via a network, where the transaction information includes a particular amount of content related to the near field transaction that corresponds to a selected reward level, of a plurality of reward levels, of a data mining rewards program in which a user of the mobile device is enrolled;
 producing a mining result based on the transaction information, where the mining result identifies characteristics of the mobile device with respect to the transaction or other transactions; and
 sending the mining result to a destination device via the network.

16. The method of claim 15, further comprising:
 sending identifying information to the mobile device via a far field wireless link, where the identifying information is related to the authentication request.

17. The method of claim 15, further comprising:
 storing the transaction information on behalf of the transaction device, the mobile device, or another device.

18. The method of claim 15, wherein the producing further comprises:
 running a data mining application against the transaction information to produce the mining result.

19. The method of claim 15, further comprising:
 receiving user information from the mobile device via a wireless network link; and wherein the producing further comprises:
 processing the transaction information with the user information to produce the mining result.

20. The method of claim 15, wherein the sending further comprises:
 sending the mining result to the destination as part of a managed service.

21. The method of claim 15, further comprising:
 identifying a reward for the mobile device based on the transaction information, user information, or other information; and
 sending the reward to the mobile device.

22. The method of claim 15, further comprising:
 providing near field or far field wireless communication services to the mobile device as a managed service.

23. A server, comprising:
 a first module to:
  provide communication services to a portable device,
  register the portable device for a selected reward level, of a plurality of reward levels, in a rewards program, receive user information, corresponding to the selected reward level, from the portable device when the portable device is registered, and provide an identifier to the portable device to establish an identity of the portable device to a register during a near field communication session;

a second module to:

receive an authentication request on behalf of the register, where the authentication request is related to the identity of the portable device, send an authorization to the register when the identity of the portable device is valid, where the authorization indicates that the identifier matches information in the authentication request, receive transaction information from the register, where the transaction information corresponds to the selected reward level and identifies items purchased on behalf of the portable device, and send a reward to the portable device, where the reward corresponds to the selected reward level and is related to the transaction information or the user information; and a third module to:

process the transaction information and the user information to produce a data mining result that identifies characteristics of the transaction, the portable device, a user of the portable device, or the register, identify the reward based on the transaction information, the user information, other information, or the data mining result, receive a request for the data mining result from a subscriber, send the data mining result to the subscriber in response to the request, and bill the subscriber for the data mining result or for services related to the data mining result.

* * * * *